United States Patent

[11] 3,552,400

| [72] | Inventors | Richard M. Berger;<br>Reavis C. Sproull, Richmond, Va. |
|---|---|---|
| [21] | Appl. No. | 644,614 |
| [22] | Filed | June 8, 1967 |
| [45] | Patented | Jan. 5, 1971 |
| [73] | Assignee | American Filtrona Corporation<br>Richmond, Va.<br>a corporation of New York |

[54] FILTER PLUG OF STAPLE FIBER FILTER ELEMENTS AND THE LIKE
11 Claims, 3 Drawing Figs.

[52] U.S. Cl. ..................................................... 131/261,
131/267, 131/268, 131/10.5
[51] Int. Cl. ....................................................... A24d 01/04,
A24f 07/04
[50] Field of Search ............................................ 131/267,
268, 10.5, 10.7, 11, 261

[56] References Cited
UNITED STATES PATENTS
2,968,857 1/1961 Swerdloff et al. ............. (131/268UX)

| 3,050,430 | 8/1962 | Gallagher ..................... | (131/268UX) |
| 3,224,453 | 12/1965 | Mahoney et al. ............. | 131/268 |
| 3,405,717 | 10/1968 | Berger et al. ................. | 131/11X |
| FOREIGN PATENTS |
| 121,414 | 5/1946 | Australia ....................... | 131/10 |
| 121,415 | 3/1944 | Australia ....................... | 131/266 |

Primary Examiner—Aldrich F. Medbery
Assistant Examiner—James H. Czerwonky
Attorney—Jacobi & Davidson ABSTRACT: The production of a filter plug comprising staple fiber smoke filter elements and the like directly from a continuous filamentary tow. The plug comprises filamentary staple fibers and has an AFC hardness in excess of 180 and a density of less than 0.120 grams per cubic centimeter. The filter plugs have functional and physical characteristics comparable to prior art filter elements, but require 20—30 percent less material. The filter elements can be supplemented by various additive materials.

Richard M. Berger
Reavis C. Sproull
INVENTORS

BY Jacobi & Davidson
ATTORNEYS

FILTER PLUG OF STAPLE FIBER FILTER ELEMENTS AND THE LIKE

This invention relates to the production of stable elongated bodies, and is particularly concerned with making bodies of such type that are suitable for use as smoke filters.

Various prior art techniques are known for making filters for use in connection with cigarettes, cigars or the like wherein the starting material is a tow-type material such as cellulose acetate or the like. Additionally, various prior art procedures are known for making such filter elements from staple fibers. However, there is no known prior art technique for continuously forming staple fiber filter elements from a starting material consisting of a filamentary tow, and the instant invention is concerned with the provision of such a process. Clearly, the ability to provide a staple fiber filter in a completely continuous manner at commercial speeds is highly desirable.

Various disadvantages exist in the production of tow-type filters according to present techniques and various other disadvantages exist with respect to the production of staple fiber filters according to present techniques. Tow processing procedures produce products, the characteristics of which are difficult to modify significantly without changing the type of tow utilized as the starting material. Ordinary staple fiber processing procedures are discontinuous in nature thereby rendering them commercially unattractive and are further complicated by the need for handling the individual discrete fibers.

The instant inventive concepts overcome the difficulty in handling the discrete staple fibers in that the entire process is continuous and, further, provides a product, the physical and functional properties of which can be readily varied to a great degree without modifying the starting material. Further, the instant invention provides for the production of a staple fiber filter element which, to produce the same physical and functional properties as are available with prior art procedures, utilizes 20—30 percent less material. The great significance of this feature from an expense standpoint will be readily recognized.

While the various techniques and disadvantages of the same described hereinabove are believed to be representative of the manufacturing methods in most widespread use at the present time, it is to be understood that the foregoing is not intended to be comprehensive and, by contrasting the instant inventive concepts with prior art procedures, other undesirable features inherent in the latter will be readily recognized. Additionally, objects hereof other than those set forth previously will either be set forth specifically or will be obvious from the following detailed description. Such description makes reference to the annexed drawing wherein:

The term "continuous filamentary tow," as used in this specification and the appended claims, is intended to define a material such as that which results when filaments extruded from a plurality of spinnerets are brought together and combined to form a continuous body of fibers randomly oriented primarily in a longitudinal direction. In such a tow, the filaments are generally longitudinally aligned in substantially parallel orientation, but include crimped portions which may form short sections running more or less at random in nonparallel diverging and converging directions.

Continuous filamentary tows of plasticized cellulose acetate fibers as well as various other plastic materials such as the polyolefins, e.g., polyethylene and polypropylene nylon, the polyesters, e.g., polyethylene terephthlate and the like have been used heretofore in the manufacture of smoke filters for cigarettes, cigars and the like. Although the process of this invention is applicable to the various filamentary materials of this type, since plasticized cellulose acetate is the most common plastic used in the manufacture of cigarette filters, the specification hereof will be generally set forth in terms of this material. However, it is to be understood that the instant inventive concepts are not to be limited to this preferred embodiment since the use of materials other than cellulose acetate would necessitate only slight modifications in the processing techniques which would be obvious to those skilled in the art.

In the following description, however, it will be assumed that a continuous filamentary tow 126 has been formed from spinneret devices by any of the established techniques widely used in the industry today for formation of "cigarette filter" tows, and that the tow 126 has been stored such as in a bale 128 or the like from which it can be withdrawn as desired for the further processing now to be described. Such a tow is generally referred to as a "raw" or "untreated" tow, and, as is well known, the fibers thereof are normally crimped and unbonded.

Figure 1:
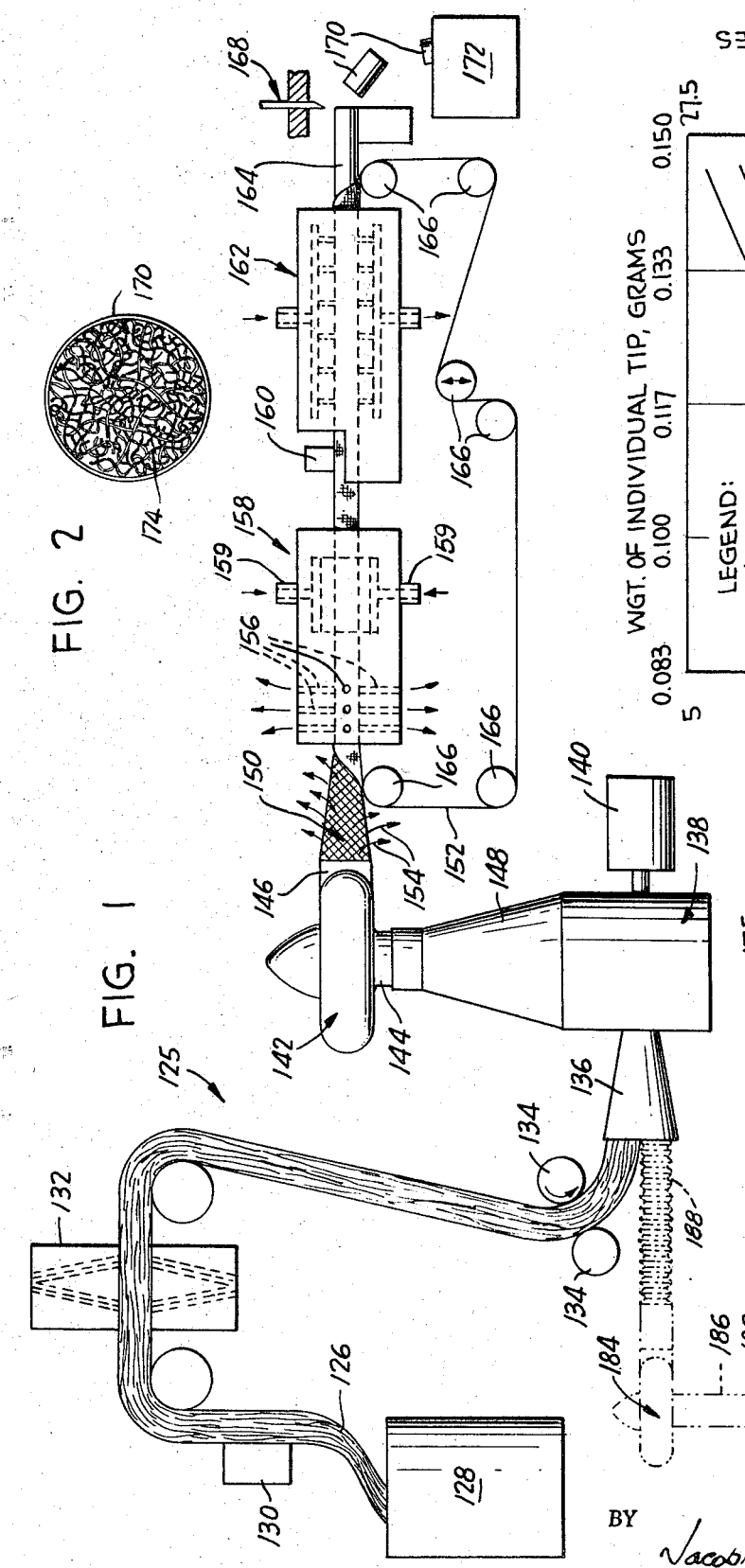
FIG. 1 is a schematic representation of a technique for producing stable elongated elements of staple fibers utilizing filamentary tow as the initial starting material, certain hidden parts being shown in dotted lines for illustrative clarity and modification of the technique to include an additive material with the staple fibers being shown schematically also in dotted lines.

Known techniques can be initially followed in carrying out the instant invention, and as shown in FIG. 1, the raw tow 126, in its crimped form, is passed through a conventional banding device 130 which comprises multiple jets disposed to blow air under pressure against the tow so as to separate the individual fibers thereof. The banded tow may then be passed between pairs of rollers (now shown) to render the crimps therein of uniform character, following which the material passes through another banding device (now shown) similar to the device 130, which may be utilized to spread the tow into a relatively thin filamentary layer.

As shown in FIG. 1, the filamentary layer is then passed through a plasticizing device 132 wherein a suitable plasticizer such as triacetin, triethyl citrate or the like is sprayed by suitable jets onto one or both sides of the filamentary layer to form a plasticized tow. The quantity of plasticizer may vary, although the instant invention requires no more than, and frequently less than prior art techniques.

Any conventional feeding means such as the pair of rollers 134 may be utilized to deliver the plasticized tow to the processing apparatus to be described in more detail hereinafter. Of course, it is to be understood that at least one of these rollers 134 must be driven to effect the withdrawal of the "raw" tow 126 from the bale 128.

The tow speed can be sufficiently great to provide satisfactory commercial production rates. The feeding rate must be correlated with the capacities of the various processing stations and the desired properties of the final product as will be discussed hereinafter. Such correlation can be readily accomplished by those with ordinary skill in the art.

The tow 126 is fed by the rollers 134, preferably through a funnel 136, to a chopper 138 operatively connected to a speed control mechanism shown schematically at 140. The chopper 138 severs the continuous tow 126 into a multiplicity of discrete staple fibers, the length of which depends upon the relationship between the speed of the chopper and the rate of feed of the continuous tow.

A blower is shown schematically at 142 and comprises a housing defining a confined area within which is disposed a fan (now shown) so as to draw an air stream through the confined area creating a vacuum at the entrance 144 and a positive pressure at the exit 146. The staple fibers produced by the chopper 138 are sucked from the chopper through the element 148 which connects the exit of the chopper with the entrance of the blower.

The turbulent air stream created in the blower 142 disperses the staple fibers and carries the same to the exit 146 at which point the air stream containing the dispersed staple fibers is blown through a porous or pervious enclosing means in the form of a frustoconical screen 150, the smaller or outlet end of which feeds onto a porous or pervious belt 152 to be described in more detail hereinafter. A major portion of the air stream is dissipated through the conical screen 150 as schematically illustrated by the arrows 154, the remainder of the air stream carrying the fibers into the belt 152 and being dissipated through apertures 156 in the initial portion of the steam-treating station 158.

It will be noted that the porous enclosing means is tapered whereby it functions to slow the speed of the staple fibers passing therethrough. Further, the tapered nature of the screen has a tendency to dispose the staple fibers so that the length of at least a predominant portion of them is disposed substantially transversely to the longitudinal axis of the continuous element to be produced therefrom. The porosity of the screen 150 will, at least partially, regulate the amount of air dissipated therethrough and the speed with which the fibers move as they enter the steam-treating station 158, a 100 mesh screen being found preferably for most applications in accordance with the instant invention.

It will be recognized that, at least to some extent, the length of the staple fibers will affect the resultant properties of the product. According to the invention, the fibers can be varied substantially from as little as one-eighth of an inch up to approximately 2 inches, although approximately three-eighths of an inch is preferred. In fact, it desirable that at least a predominant portion of the staple fibers are slightly longer than the diameter of the finished product so that they will tie-back slightly when they extend substantially transverse to the longitudinal dimension of the finished product thereby improving the interengagement of the fibers.

The preferred embodiments of this invention contemplates using a woven nylon belt as the element 152 preferably having a porosity such that the various gaseous mediums, e.g., steam and air, to be utilized in treating the material therewithin the processing stations to be described in more detail hereinafter, can pass through the belt and actually penetrate the material for optimum and substantially uniform results throughout the entire cross section of the material. Preferably, of course, the pores in the belt are smaller than any of the material although the housings of the processing stations may assist in supporting the belt to retain the material therewithin.

If desired, the belt may be provided with a lubricating or wear-resisting coating such as polytetrafluorethylene or a silicone emulsion. Such materials improve the water resistant properties of the belt as well as preventing adhesion between the belt fibers and the material carried thereby.

The belt is flexible whereby it can be utilized to form the material into a desired shape and the belt is also "porous" whereby various gaseous materials such as steam and air can be passed directly into the material being processed while the same is confined and carried in a continuous manner by the belt and without the steam or air being hampered or restricted by the belt in its travel to and through the material being processed. In this regard, the term "porous" as used herein and in the appended claims relating to the belt and to the nature of the product, is to be understood in the sense of "pervious," that is capable of passing a fluid or gaseous material therethrough. The belt is of course relatively thin and offers no significant barrier to the passage of the processing fluids therethrough whereas the filter plug or element, being elongated, provides a tortuous path for passage of cigarette smoke or the like resulting in pressure-drop characteristics conventionally encountered with such devices. In fact, one of the significant advantages hereof is the ease with which pressure-drop characteristics may be modified.

After the staple fibers have been fed onto the porous belt 152, the belt is formed about them at the entrance to the steam-treating chamber 158 by passing through the bore in the steam-treating station. The bore of the steam-treating station 158 has a circumference so dimensioned with respect to the width of the belt 152 as to form the belt into a substantially closed cross section as it moves through the bore. Thus, the screen 150 partially or initially forms the staple fibers and the belt completes the formation of the same.

Since there is some difficulty in forming the belt 152 around the staple fibers in a manner to provide a perfect meeting of the longitudinal edges of the belt, a longitudinal seam will ordinarily result during this initial forming operation. This seam is removed by a pressing operation to be explained in more detail hereinafter.

The bore in the steam-treating station 158 receives steam from a source of the same (not shown) through a pair of oppositely disposed conduits 159 feeding into an elongated chamber within the station and connected to the bore by centrally positioned passageways all as shown schematically in FIG. 1. Thus, steam under pressure is passed continuously and directly through the porous surface of the belt 152 and into the staple fibers as the same is carried by the belt through the steam-treating station 158 to produce a steam-treating elongated element, generally having a longitudinal seam formed by the belt edges. In this manner the bonding constituents of the staple fibers are activated by the steam while the fibers are carried by the belt.

The steam requirements can be varied to produce the desired activation of the bonding constituents of the staple fibers (e.g., plasticizer with cellulose acetate fibers) and the exact quantities and qualities of the steam for a particular application can readily be developed by those with ordinary skill in the art.

Figure 2:
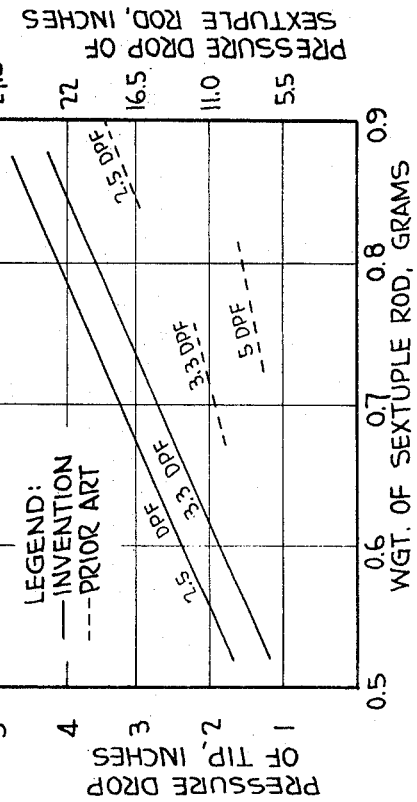
FIG. 2 is an enlarged end view of a filter plug formed according to the process of FIG. 1.

The housing 160 of the cooling station 162 defines a confined area in the form of an elongated cylindrical bore of a circular cross section substantially corresponding to that of the final product as will be seen in FIG. 2 and also the bore of the steam-treating station 158. The circumference of the confined area in the cooling station 162 is preferably substantially equal to the width of the belt 152 whereby the longitudinal edges of the belt substantially meet during passage through the cooling station. It will be noted that the cooling station 162 is preferably substantially longer than the steam-treating station 158 since it has been found that the production speed of the apparatus is dependent on the cooling capabilities in this station.

In order to provide for the most efficient cooling characteristics the station 162 is provided with a pair of elongated plenum chambers which communicate with the confined area through which the belt 152 passes, by means of a plurality of longitudinally spaced passageways all as shown schematically in FIG. 1. The upper plenum chamber receives air or other inert cooling gas, preferably under pressure, through a conduit from a source (not shown). Similarly, a conduit communicates with the lower plenum chamber for removal of the air, vacuum being supplied at this point, if desired. In any event, it will be seen that the cooling gas is actually forced through the steam-treated element as the same is carried by the belt 152 through the cooling station 162. Thus, the drying of the element and the setting of the bonding constituents of the same take place substantially in the absence of any tension.

As in the case of the steam requirements, the cooling gas may be varied within the skill of the ordinary artisan to insure that the desired characteristics in the final product will be obtained.

At the cooling station, the gas is passed into and through the formed material for essentially two purposes, namely, to cool and set or cure the previously activated bonding constituent and to remove excess moisture from the material. When the steam is passed to and into the staple fibers to activate the bonding constituent, there is a tendency for the same to condense thus giving the product excessive moisture. Moreover, the steam expedites the action of the plasticizer on the fibers, i.e., it activates the bonding constituent so as to cause instantaneous bonding of the plasticized material. Thus, while the steam serves to efficiently and uniformly activate the bonding constituent at high speeds, it has been found necessary at the cooling station to not only deactivate the bonding constituent but to also remove the excess moisture. In fact, the steam preferably causes full utilization of the plasticizer and the cooling gas then basically functions to remove excess moisture in the element resulting from condensation of the steam and rigidify the rod being produced. Therefore, the terminology "set the bonding constituent" as used herein is to be understood as including the operation just described when there is no plasticizer remaining in the tow to deactivate after the steam treatment.

With respect to the operations at both the steam treating and cooling stations, it is significant to note that the steam and air respectively pass to and into the material within the belt 152 without experiencing any significant or substantial flow resistance from the belt. The belt is thus sufficiently porous by virtue of its open mesh characteristics, to effectively permit vapor and gas passage therethrough without obstruction. This is to be distinguished from a fabric or closely woven belt wherein heat may be conducted therethrough, but obstruction and resistance is encountered in the passage of any gas or vapor therethrough.

The product 164 is peeled from the belt 152 as the same leaves the cooling station 162 and the belt 152 is substantially flattened and continuously orbited over the path-defining and tensioning rollers 166 to receive additional staple fibers from the screen 150. The stable continuous element 164 is then severed by cutting means shown schematically at 168 to form segments 170 collected as at 172.

The term "stable" as used herein and in the appended claims with reference to the products of this invention shall be understood to be relative and although, in most instances, the products hereof do not need overwrapping to render them self-sustaining, in some instances, overwrapping is desirable for ease of handling or for special applications.

In FIG. 2, it will be seen that the element 170 comprises a multiplicity of individual or staple fibers 174 generally extending transversely to the longitudinal axis of the element and tying-back slightly to form a multiplicity of contact points at which the staple fibers are bonded to each other to produce a porous matrix providing a labyrinth of smoke passages when utilized as a cigarette filter or the like. The filter element hereof preferably has substantially uniform physical characteristics throughout any cross section thereof. As will be shown by the examples hereinafter, the characteristics of a product formed according to this embodiment can be varied substantially while utilizing the same initial tow material by merely varying the feed rate into the chopper means. Additionally, as will also be shown hereinafter, the product has completely acceptable commercial properties, comparable to prior art filter plugs, while utilizing substantially less material, from 20 to 30 percent less in most instances thereby effecting a substantial saving in material costs.

Thus, while this embodiment preferably utilizes the forming means described hereinabove, it will be seen that the initial processing steps significantly modify the final product. Besides providing a continuous process for the production of filter elements and the like formed of staple fibers wherein the filamentary tow is chopped into the staple fibers and directly fed into the forming means, a technique results which provides significant savings in material utilized.

Of course, while this embodiment has been described particularly with reference to plasticized cellulose acetate, the various other filamentary materials described hereinabove can be readily substituted therefor with only slight modifications within the skill of the art. Additionally, the tow material can be blended with an additive for special applications. In FIG. 1, such an arrangement is shown in dotted lines. A roll of additive material, for example, pulp in sheet form is designated by the reference numeral 175 and is fed by rollers 176 into a chopper 178 quite like the chopper 138. The chopped pulp is then drawn through element 180 into a hammermill 182 wherein it is further fiberized to produce relatively fine fibrous material. A blower 184 sucks the fibers from the hammermill 182 through element 186 and blows the same through conduit 188 into the funnel 136 where they are fed with the tow 126 into the chopper 138.

The quantity of additive material can be varied substantially and with up to approximately a 50/50 blend, the plasticizer on the cellulose acetate tow is generally sufficient to satisfactorily bond the final product. However, if blends having larger quantities of additive material such as 75/25 blend is desired, additional bonding agents may be included such as fibrous or particulate polyethylene or the like. In any event, the use of such additives can further reduce the cost of the final product.

Various pulp materials including kraft pulp, sulfite pulp and alpha pulp fibers can all be utilized as well as numerous other materials including shredded bagasse fibers, cotton linters, wool, glass fibers, fine viscose fibers and other such materials, either alone or in admixture. Thus, the type of additive will be seen not to be critical and the illustrative embodiment disclosed and described in the drawings will be understood as not limiting on the instant inventive concept.

Additionally, while the additive material is preferably one of the above materials other additive materials may be fed with the chopped tow into the blower 142 or otherwise fed into the belt 152 for particular applications. Such additives may be in the form of a liquid or in the form of a particulate material and may serve to modify the structural or functional properties of the final product. For example, various sorbent materials may be included to improve the filtration effected by the final product if the same is to be used as a cigarette or industrial filter. Exemplary of such materials are activated carbon, silicagel, alkali metal aluminosilicates such as Molecular Sieves sold by Linde Company, a Division of Union Carbide Corporation, sucrose, activated alumina, volcanic ash, sepiolite, granular calcium carbonate, granular sodium carbonate, Fuller's Earth, magnesium silicates, asbestos powder, metallic oxides such as iron oxide and aluminum oxide, metal treated carbon and the like. Additionally, where porosity or strength properties are a major consideration, metal fibers or even fibrous carbon can be included. Moreover, taste modifiers such as menthol or other similar materials may be incorporated for obvious purposes. Additionally, certain particulate resinous materials such as finely divided polyethylene or polypropylene may be included to improve the binding characteristics as well as the filtration properties of the final product. Mixtures of the above materials are also contemplated. Activated carbon is particularly useful.

Another important feature of the invention is that the starting material, that is, the filamentary tow, need not be highly crimped in order to provide a desirable porous matrix, even noncrimped material being useful. With prior art conventional filamentary tow processing techniques, a relatively small variation in the properties of the product can be achieved utilizing a particular filamentary tow. However, in order to realize significant differences in product characteristics, the starting material, that is, the filamentary tow, must be changed. In other words, a material having a different denier per filament and total denier must be substituted if significant product differences are necessary. However, according to the instant invention, substantial modifications in the product can be effected utilizing the same starting material merely by modifying the rate of feed of the material into the chopper whereby, for example, the pressure drop and weight of the product can be substantially altered with the same basic tow as a starting material.

Figure 3:
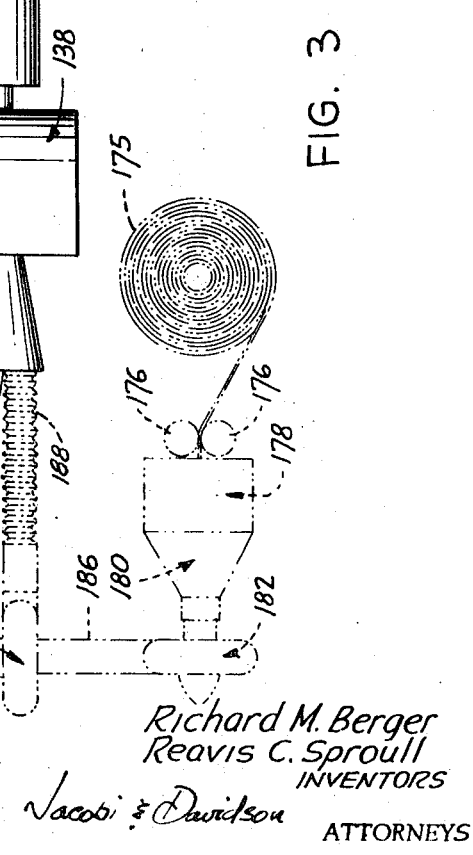
FIG. 3 is a graph comparing the pressure drop versus weight characteristics of a product prepared according to the process of FIG. 1 with a more conventional filter element.

This great variation is exemplified by the graphic illustration of FIG. 3 wherein it will be seen that, utilizing the concepts of the instant invention, significant differences in pressure drop and weight can be effected with a particular filamentary tow. For example, it will be noted that utilizing a 2.5 denier per filament tow, with proper modification of the feed rate, etc., according hereto, a pressure drop variation for a 120 mm. sextuple rod of between approximately 9 and 25 inches of water is possible as well as a weight variation for such a rod of from close to 0.5 grams to almost 0.9 grams. A similar significant variation in the properties of a product utilizing a 3.3 denier per filament tow is also shown. In contrast, with prior art techniques, it will be seen that, with a particular type of starting material, only a slight variation in pressure drop and weight characteristics can be effected. Thus, if any significant change in the properties of the product is desired, it is necessary to modify the filamentary tow utilized as the starting material.

Further understanding of the above will be gained from a review of the following examples wherein, utilizing a particular cellulose acetate tow, a great variation in product characteristics was obtained by modifying the feed rate of the tow into the chopper.

Reference is first made to table 1 below, wherein a 2.5 denier per filament, 51,000 total denier, cellulose acetate tow was utilized in the preparation of filter rods having an approximate diameter of 7.9 mm. and a sextuple length of 120 mm.:

TABLE 1

| Example No. | Weight w/o paper, gm. | Density, gm./cc. | P.D., inches H$_2$O | AFC Hardness |
| --- | --- | --- | --- | --- |
| 1 | 0.530 | 0.090 | 11.0 | 193 |
| 2 | 0.566 | 0.098 | 12.6 | 197 |
| 3 | 0.624 | 0.108 | 14.5 | 212 |
| 4 | 0.673 | 0.116 | 15.7 | 226 |
| 5 | 0.732 | 0.126 | 18.7 | 241 |
| 6 | 0.767 | 0.132 | 19.7 | 249 |
| 7 | 0.853 | 0.147 | 17.4 | 190 |
| 8 | 0.878 | 0.151 | 17.6 | 194 |
| 9 | 0.910 | 0.157 | 18.1 | 200 |

The term "pressure drop" or P.D. as used herein, refers to a pressure drop measurement across a filter rod under test. For this purpose, as conventional, a smoke stream through the filter is created having a flow rate of 17½ cubic centimeters per second. Then, through the use of a conventional U-tube containing water, the difference in pressure at the inlet end of the filter and at the outlet end of the filter is measured in terms of inches of water.

The term "AFC hardness" as used herein and in the appended claims, is based on the following test. The testing apparatus is a Model 551 micrometer manufactured by Testing Machines, Inc., Mineola, N.Y. The micrometer has a dead weight loading of approximately 2½ pounds with the weight on and exerts a pressure of 7 to 9 pounds per square inch. After the size and weight are determined on the rods, they are fully cured by placing them in an oven at 110° C. for 5 minutes, then exposing them to room temperature for another 5 minutes. The micrometer is opened to its stop point of 0.3438 inches. The rod is placed on the lower anvil of the micrometer, seam up, and the upper anvil is then released. The reading is immediately taken after the anvil has come to rest, with no waiting period. This reading is the final diameter of the rod, as compressed by the weight, in inches multiplied by 1000. Commercially acceptable filter rods of a 7.9 mm. diameter (0.311 inches) have an AFC hardness of at least 180, preferably in excess of 200.

Referring now to examples 1 to 4 above, it will be seen that, utilizing the technique of this invention, a filter rod can be produced having an AFC hardness in excess of the commercially acceptable value with a density of less than 0.120 grams per cubic centimeters. Such characteristics are only attainable utilizing the instant inventive concepts, ordinary processing techniques otherwise producing either an unduly low AFC hardness or an unduly high density. The significance of the capability of producing satisfactory hardness with such relatively low density will be readily recognized in that this is an indication of the amount of material necessary for the manufacture of the filter elements.

By further reference to examples 1 to 6, it will be seen that, by modifying the tow feed rate into the chopper, a great variation in both density, pressure drop and hardness can be attained, the density varying from 0.090 grams per cubic centimeter in example 1 to 0.132 grams per cubic centimeter in example 6, the pressure drop varying from 11.0 inches of water in example 1 to 19.7 inches of water in example 6 and the AFC hardness varying from 193 in example 1 to 249 in example 6. In contrast, examples 7 to 9 show the production of conventional filter elements utilizing a 2.5/51 cellulose acetate tow, and varying the amount of stretch in the tow from minimum to maximum to thereby obtain the maximum variation in product characteristics. First of all, in each instance, it will be seen that in order to provide an acceptable AFC hardness, relatively high densities are required. Additionally, the variation in the density, the pressure drop and the AFC hardness are relatively slight regardless of the amount of stretch left in the tow.

Similar results can be seen in tables 2 and 3 hereinbelow wherein 3.3 denier per filament, 44,000 total denier, tow was utilized in table 2, examples 10 to 19 and 5 denier per filament, 45,000 total denier, was utilized in table 3, examples 20 to 28.

TABLE 2

| Example No. | Weight w/o paper, gm. | Density, gm./cc. | P.D., inches H$_2$O | AFC Hardness |
| --- | --- | --- | --- | --- |
| 10 | 0.518 | 0.098 | 8.9 | 200 |
| 11 | 0.581 | 0.100 | 10.2 | 212 |
| 12 | 0.637 | 0.110 | 11.8 | 233 |
| 13 | 0.695 | 0.120 | 14.1 | 235 |
| 14 | 0.741 | 0.128 | 15.5 | 248 |
| 15 | 0.786 | 0.136 | 16.9 | 259 |
| 16 | 0.861 | 0.149 | 20.9 | 271 |
| 17 | 0.667 | 0.117 | 9.7 | 165 |
| 18 | 0.712 | 0.123 | 10.8 | 189 |
| 19 | 0.770 | 0.133 | 11.9 | 185 |

TABLE 3

| Example No. | Weight w/o paper, gm. | Density, gm./cc. | P.D., inches H$_2$O | AFC Hardness |
| --- | --- | --- | --- | --- |
| 20 | 0.511 | 0.088 | 5.4 | 202 |
| 21 | 0.571 | 0.099 | 6.2 | 215 |
| 22 | 0.630 | 0.109 | 7.0 | 215 |
| 23 | 0.674 | 0.116 | 8.1 | 222 |
| 24 | 0.714 | 0.123 | 8.7 | 239 |
| 25 | 0.773 | 0.133 | 10.4 | 244 |
| 26 | 0.727 | 0.126 | 7.3 | 204 |
| 27 | 0.785 | 0.135 | 8.5 | 230 |
| 28 | 0.827 | 0.143 | 9.1 | 229 |

Once again, it will be noted that only utilizing the concepts of the instant invention can a product be produced having an AFC hardness in excess of 180 with a density of less than 0.120 grams per cubic centimeter. Additionally, the great variation in product characteristics evidenced with those examples illustrating the instant invention, that is, examples 10 to 16 and 20 to 25 compares favorably with the relatively slight variation in product characteristics utilizing conventional techniques, as in examples 17 to 19 and 26 to 28.

Reference is now made to table 4, below, wherein various products made according to the instant invention are compared to prior art products having similar pressure drop.

TABLE 4

| Example No. | Acetate tow | Wt. 120 mm. w/o paper, gm. | Wt./20 mm., gm. | | Density, gm./cc. | P.D. 20 mm., inches H₂O | TPM retention, percent | Remarks |
|---|---|---|---|---|---|---|---|---|
| | | | Acetate | Plasticizer | | | | |
| 29 | 3.9/46 | 0.86 | 0.79 | 0.07 | 0.148 | 1.7 | 39 | Prior art. |
| 30 | 3.3/44 | 0.58 | 0.53 | 0.045 | 0.098 | 1.7 | (¹) | Invention. |
| 31 | 3.3/44 | 0.85 | 0.76 | 0.09 | 0.146 | 2.0 | 44.9 | Prior art. |
| 32 | 3.3/44 | 0.64 | 0.58 | 0.06 | 0.110 | 2.0 | 42.0 | Invention. |
| 33 | 3.3/44 | 0.77 | 0.72 | 0.05 | 0.133 | 2.25 | 44.8 | Prior art. |
| 34 | 3.3/44 | 0.64 | 0.58 | 0.06 | 0.110 | 2.25 | (¹) | Invention. |
| 35 | 3.3/44 | 0.86 | 0.79 | 0.07 | 0.148 | 2.5 | 47.8 | Prior art. |
| 36 | 3.3/44 | 0.66 | 0.60 | 0.06 | 0.114 | 2.5 | 46.3 | Invention. |
| 37 | (²) | 0.66 | | | 0.144 | 2.3 | 46 | Do. |
| 38 | (³) | 0.71 | | | 0.123 | 2.2 | 52 | Do. |

¹ Not tested.
² 30% pulp; 60% 3.3/44; 10% plasticizer.
³ 46% pulp; 47% 3.3/44; 7% plasticizer.

Example 30 shows that for a 1.7 inches of water pressure drop on a 20 mm. tip, a density of only 0.098 grams per cubic centimeter is necessary with the instant invention as compared to a density of 0.148 in example 29 with prior art techniques. Similarly, for a 2.0 inch pressure drop, the instant invention in example 32 requires a density of 0.110 as compared to a density of 0.146 in example 31 with prior art techniques. For a 2.25 inch pressure drop the instant invention requires a density of only 0.110, as shown in example 34 and as compared to a density of 0.133 in example 33 for the same pressure drop. Finally, example 36 shows the instant invention requiring a density of only 0.114 for a 2.5 inch pressure drop as compared to a density of 0.148 in example 35 for the same pressure drop.

To ascertain total particulate matter (TPM) retention percent, as is also conventional, a Cambridge filter apparatus is utilized. The filter under test, in this instance, is placed in series relation with the standard Cambridge filter (the Cambridge filter being accepted in the industry as the standard having 100 percent retention). Then, a cigarette is puffed by the apparatus with a 35 cc. puff over a 2 second interval and at a rate of 1 puff per minute. The material collected on the filter undergoing the test and the material collected on the Cambridge filter together yield the total solids. The material or solids collected on the filter undergoing testing (as determined by a conventional weight comparison), is then compared against the total, and the retention percent of the filter under test is calculated. Commercially desirable filter elements have a TPM efficiency of at least about 25 percent for a conventional 20 mm. by 7.9 mm. plug. This testing method is conventional, as indicated, and accordingly, further discussion appears unnecessary. However, it will be noted from table 4 that the filters of the instant invention are at least substantially as effective as the prior art filters in this regard.

Examples 37 and 38 show physical and functional characteristics of filters made according to this invention as modified in the manner of the procedure shown in dotted lines in FIG. 1. In example 37, a filter comprising approximately 30 percent pulp, approximately 60 percent 3.3/44 cellulose acetate tow and approximately 10 percent plasticizer was produced and in example 38 a filter comprising approximately 46 percent pulp, approximately 47 percent 3.3/44 cellulose acetate tow and approximately 7 percent plasticizer was produced. In each instance, fully satisfactory products are attainable, the substitution of pulp or other similar material for cellulose acetate tow reducing the cost of the filter due to the relatively low cost of this additive material.

Results similar to those set forth hereinabove with cellulose acetate tow can be realized utilizing the other filamentary materials set forth hereinabove.

Although a circular rod has been described herein, those familiar with the art will readily appreciate the fact that other shapes can be easily formed in accordance with the process hereof by merely varying passageways and/or guide member contours.

Although the instant inventive concepts have been generally described with reference to the production of cigarette filters or the like, it will be seen that the resultant product may have many other uses, both related and unrelated to the smoke filtration of a filter cigarette. For example, the individual gas-liquid may be utilized as industrial smoke filters or gas-liquid contact elements whereby the material being processed passes directly through the element as in a cigarette filter or, alternatively, into peripheral contact with a plurality of such elements as in the well-known "stacked columns." Further, the capillary properties of the product of the instant invention may be utilized, for example, in the use of the product elements as ink absorbers within dispensing containers such as the common "felt" marking devices. Other similar applications for such products will be obvious to those with ordinary skill in the art and it is intended that the reference throughout this specification to smoke filters be considered merely as illustrative of the preferred use, rather than as limiting on the instant inventive concept.

Having now described the inventive concepts hereof, having presented illustrative examples of products made in accordance with the various embodiments hereof and having set forth various advantages of the instant invention, it should be apparent that the objects set forth at the outset of this specification have been successfully achieved.

We claim:

1. In a filter element comprising a porous elongated plug, comprising filamentary staple fibers, the improvement which is characterized by said plug having an AFC hardness in excess of 180 and a density of less than 0.120 grams per cubic centimeter.

2. In a cigarette including a filter section and a tobacco section, the improvement which is characterized by said filter section comprising an elongated plug as defined in claim 1.

3. The filter element defined in claim 1 wherein said AFC hardness is in excess of 200.

4. The filter element defined in claim 1 wherein for a section of approximately 20 mm. in length and approximately 7.9 mm. in diameter said plug has a total particulate matter filtration efficiency of at least about 25 percent.

5. The filter element defined in claim 1 wherein said plug has substantially uniform physical characteristics across all cross sections thereof.

6. The filter element defined in claim 1 wherein said plug comprises a porous matrix defined by a multiplicity of staple fibers wherein substantially all of said fibers are bonded to adjacent fibers at points of contact of said fibers with each other.

7. The filter element defined in claim 1 wherein said staple fibers are formed, at least in predominant part of plasticized cellulose acetate.

8. In a filter element comprising an elongated plug in the form of a porous matrix defined by a multiplicity of filamentary staple fibers wherein substantially all of said fibers are bonded to adjacent fibers at points of contact of said fibers with each other, said plug having an AFC hardness in excess of 180 and a density of less than 0.120 grams per cubic centimeter, the improvement which is characterized by at least a predominate portion of said staple fibers extending transverse to the elongated axis of said plug.

9. The filter element defined in claim 8 wherein at least a predominant portion of said staple fibers are longer than the minimum width of said plug.

10. A filter element comprising an air permeable form retaining deformation resistant rod comprising a plurality of filamentary fibers of between one-eighth inch to 2 inches in length cut from a continuous filamentary tow, at least some of said fibers laying transversely to the longitudinal axis of the rod and substantially all of said fibers being bonded to adjacent fibers at their points of contact, the rod having an AFC hardness in excess of 180 and a density of not more than 0.120 grams per cubic centimeter.

11. A filter according to claim 10 wherein the fibers have a length of approximately three-eighths of an inch.